United States Patent [19]
Earl et al.

[11] Patent Number: 5,815,686
[45] Date of Patent: Sep. 29, 1998

[54] METHOD AND APPARATUS FOR ADDRESS SPACE TRANSLATION USING A TLB

[75] Inventors: William J. Earl, Boulder Creek, Calif.; Wayne Stuart Mesard, Belmont, Mass.

[73] Assignee: Silicon Graphics, Inc., Mountain View, Calif.

[21] Appl. No.: 712,889

[22] Filed: Sep. 12, 1996

[51] Int. Cl.$^6$ .................................................. G06F 9/455
[52] U.S. Cl. ............................................................ 395/500
[58] Field of Search ........................... 395/500; 364/578, 364/716.06

[56] References Cited

U.S. PATENT DOCUMENTS

| | | | |
|---|---|---|---|
| 4,849,881 | 7/1989 | Eguchi ..................................... | 364/200 |
| 5,420,993 | 5/1995 | Smith et al. ............................. | 395/400 |
| 5,481,684 | 1/1996 | Richter et al. .......................... | 395/500 |
| 5,649,203 | 7/1997 | Sites ........................................ | 395/709 |
| 5,652,872 | 7/1997 | Richter et al. .......................... | 395/500 |

OTHER PUBLICATIONS

Joseph Heinrich, "MIPS R4000 user's manual", Mips Technologies Inc., pp. 61–79, Jan. 1993.

*Primary Examiner*—Kevin J. Teska
*Assistant Examiner*—Dan Fiul
*Attorney, Agent, or Firm*—Wagner, Murabito & Hao

[57] ABSTRACT

A method and a system for address space translation. The present invention is implemented on a computer system having a microprocessor with a translation look aside buffer (TLB). The address space translation system of the present invention translates an emulated virtual address space into a physical address space. The system receives a virtual address from a process running on the system. The system compares the TLB with the virtual page number of the virtual address and returns a physical page number from the TLB when there is a match in the TLB with the virtual page number. When there is not a match, the system determines whether the virtual address is an emulated virtual address or a native virtual address. If the virtual address is an emulated virtual address, the system translates the emulated virtual address to a corresponding physical address. The system then stores the virtual page number from the emulated virtual address and the corresponding physical page number in the TLB.

21 Claims, 9 Drawing Sheets

METHOD AND APPARATUS FOR ADDRESS SPACE TRANSLATION USING A TLB

FIELD OF THE INVENTION

The field of the present invention pertains to operating system virtual memory management. More particularly, the present invention relates to virtual memory management in support of software emulation.

BACKGROUND OF THE INVENTION

An operating system is a "master program" that exercises overall control, supervises the allocation of system resources, schedules operations, prevents interference between concurrently running programs, and generally coordinates the many concurrent processes in a computer system. The operating system of a powerful computer system is generally a very complex program, often comprising millions of lines of software code. Software applications of a computer system are written to take advantage of the operating system on the computer system. These applications let the operating system interface with the computer system's hardware, e.g. disk input/output (IO), virtual memory, peripheral controls, and the like, as opposed to directly interfacing with the computer system's hardware themselves. This greatly eases the burden on programmers when designing new software applications. Programmers write the software application to an application program interface (API) that is specific to the operating system on which the software program runs.

The operating system in use in most of the personal computer industry is Microsoft Windows, from Microsoft corporation, Redmond, Wash. Many computer hardware manufactures build their personal computers specifically with Microsoft Windows (Windows) operating system compatibility (e.g. the IBM PC AT configuration) in mind. By adhering to the PC AT configuration, the computer system manufacturer is assured his personal computers will run the vast number of programs written for the PC AT configuration. Many personal computer software companies, in like manner, write their software programs specifically with the Windows API and PC AT configuration in mind. By adhering to the Windows API and IBM PC AT configuration (Intel "x86" architecture) requirements, software companies are assured their software applications will run on the large numbers of personal computers built in the IBM PC AT specification. The Windows operating system, because of this, has become very widely supported in the personal computer industry, and the x86 architecture used in the PC AT configuration accounts for a large percentage of personal computers sold in the world. Since a very large percentage of personal computers in the market run Windows, a very large percentage of software applications in the market are written for Windows.

However, there are other architectures that have recently been developed which do not adhere to the x86 architecture. In recent years, reduced instruction set computer (RISC) architectures have been developed which take advantage of the latest performance enhancing advances in computer science and computer design. These RISC architectures confer many performance benefits to the user. RISC computer systems, however, cannot natively run x86 software, e.g., the Windows operating system or programs written to the Windows API. Because of this, a very large percentage of software applications in the market cannot be used by computers built around RISC processors such as the MIPS series. To run the large number of applications written to the Windows API, RISC manufacturers have turned to software emulation as a preferred technique.

A software emulation program called Soft Windows was developed by Insignia Solutions Ltd. Soft Windows enables a non-x86 computer, a MIPS architecture computer for example, to run applications written to the Windows API. The MIPS computer, while running Soft Windows, behaves as if it were an x86 computer. The MIPS computer accepts the same inputs and produces the same outputs as an x86 computer running Windows. In so doing, the MIPS computer mimics the operational characteristics of an x86 computer. Soft Windows accomplishes this by translating x86 instructions and addresses of the Windows application to native RISC instructions of the MIPS computer. Thus, the MIPS computer can run the large number of Windows applications in addition to its own native applications (applications written specifically for the MIPS architecture). The MIPS computer retains all the advantages and performance benefits conferred by its RISC architecture and, through Soft Windows, runs the large percentage of software applications written for the x86 architecture.

Virtual memory management is handled by the operating system of the host computer system. Soft Windows, while itself running as application on the host computer system, emulates through translation every x86 virtual memory access. Such accesses include x86 virtual memory requests that need to be translated into physical memory requests for the host computer system. Soft Windows provides virtual memory, in the manner of an operating system, transparently to the Windows applications. As a result, computer systems running Soft Windows appear slower in comparison to computers running applications "natively." In order to provide virtual memory to applications, Soft Windows itself uses virtual memory.

The operating system provides a data structure (often referred to as a page table) which defines and maintains a flat virtual memory space which can be allocated to an application. The structure provides a mapping between the addresses of the virtual memory space used by the application and the addresses of the physical memory space used by the computer system's hardware memory management systems which store the data in the physical memory. The virtual memory space is then used transparently by the application to access data that is stored within the physical memory space. A typical such computer system can provide memory mappings for many simultaneously running applications.

Referring to FIG. 1, an exemplary prior art virtual memory system is shown. Two virtual address memory spaces are shown as 10a and 10b for application 1 and application 2, respectively. Also shown is a large physical memory address space 20. The physical memory address space 20 is typically realized in volatile memory (e.g., random access memory). The operating system allocates a working set of physical memory to each virtual address space 10a, 10b. Working set 22a is allocated for virtual memory space 10a and working set 22b is allocated for virtual memory space 10b. A working set is divided into pages of physical memory, e.g., one page 24a is shown for working set 22a and one page 24b is shown for working set 22b. The size of a page is programmable, but one typical size is 4 kilobytes (Kb). When an application accesses data, it utilizes addresses within its virtual address space which are converted via a page table data structure into addresses within pages of the application's working set within the physical memory space 20. The operating system uses the page tables of each application to map pages of physical memory space 20 into the virtual address space (10a, 10b) that the application can access.

FIG. 2 illustrates an exemplary page table data structure 30 for an application. The page table data structure 30 is stored in the operating system's address space and maintains the mapping between an application's virtual addresses and the addresses of pages within the physical memory space 20 (FIG. 1). When a request for a virtual address is received by the operating system (e.g., over line 32) the appropriate page address of the physical memory space is output by the table (e.g., over bus 34).

FIG. 3 shows a general logical flow diagram of the Soft Windows virtual memory emulation process. Each time a Windows application 40 requests an x86 virtual memory address, Soft Windows translates the address through a well known software based address translation subroutine 41. Soft Windows performs an associative look-up in a set of x86-to-native translation tables it maintains in physical memory of the computer system. Soft Windows then requests the native virtual memory address from the host operating system 42. The host operating system then accesses its page table data structures and translates the native virtual memory address to a physical memory address 43, in the manner described in FIG. 1 and FIG. 2. This process is essentially repeated for individual virtual memory accesses of Windows application 40. As a result, computer systems running Soft Windows appear slower in comparison to computers running applications "natively." In order to provide virtual memory to applications, Soft Windows must emulate through translation each x86 virtual memory access.

Although FIG. 3 shows the logical flow diagram of the virtual memory emulation process of Soft Windows specifically, it should be appreciated that the logical flow diagram is equally applicable to other software emulation programs which emulate address spaces of other computer system architectures (e.g., besides the x86 architecture). In a computer system employing such an emulator, the logical flow described by FIG. 3 will be essentially the same. The computer system running the emulation program will appear slower in comparison to computer systems running applications natively, as described above.

The utility of a computer system often hinges upon the speed and efficiency with which the computer system executes software programs. The utility of a computer system also hinges upon the number of application programs it can support. Thus, what is desired is a method of increasing the speed of a computer system while running non-native programs through software emulation. What is further desired is a method of translating an emulated virtual memory address space into physical address space without spending a great deal of software processing time translating every emulated virtual memory address into a native virtual memory address. Such a method should not be restricted to use with software emulators of x86 address spaces, but should be equally well suited to use with software emulators of other architectures or any other application which requires efficient address space translation of a virtual address space defined at the application level. The present invention provides a solution to the above identified needs.

SUMMARY OF THE INVENTION

A method and system for address space translation using a TLB. The present invention is implemented on a computer system having a microprocessor with a translation look aside buffer (TLB). The address space translation system of the present invention translates an emulated virtual address space into a physical address space. The system receives a virtual address from a process running on the system. The system compares the virtual page number of the virtual address to entries of the TLB and returns a physical page number from the TLB when there is a match between an entry in the TLB and the virtual page number. When there is not a match, the system determines whether the virtual address is an emulated virtual address or a native virtual address. If the virtual address is an emulated virtual address, the system maps the emulated virtual address to a corresponding physical address. The system then stores the emulated virtual page number of the virtual address and corresponding physical page number in an entry of the TLB. If the virtual address is a native virtual address, the system maps the native virtual page number of the native virtual address to a corresponding physical page number using a page table. The system then stores the native virtual page number and corresponding physical virtual page number in an entry of the TLB.

On a subsequent accesses to the virtual address, the address space translation system of the present invention matches the virtual address, whether the virtual address is an emulated virtual address or a native virtual address, with the corresponding virtual page number/physical page number entry in the TLB and efficiently returns the corresponding physical address without any software translation. Where the emulated address space is an x86 address space, the present invention provides a method of translating x86 flat model virtual memory address space into physical address space without spending software translation processing time translating every x86 virtual memory address into a native virtual memory address when a TLB hit occurs. In such an embodiment, the present invention outperforms prior art emulation systems at translating x86 virtual memory address space into physical address space.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

In the following detailed description of the present invention, a method and system for address space translation using a TLB, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "translating" or "processing" or "mapping" or "returning" or "matching" or "indexing" or "storing" or the like, refer to the action and processes of a computer system (e.g., 112 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

Figure 1:
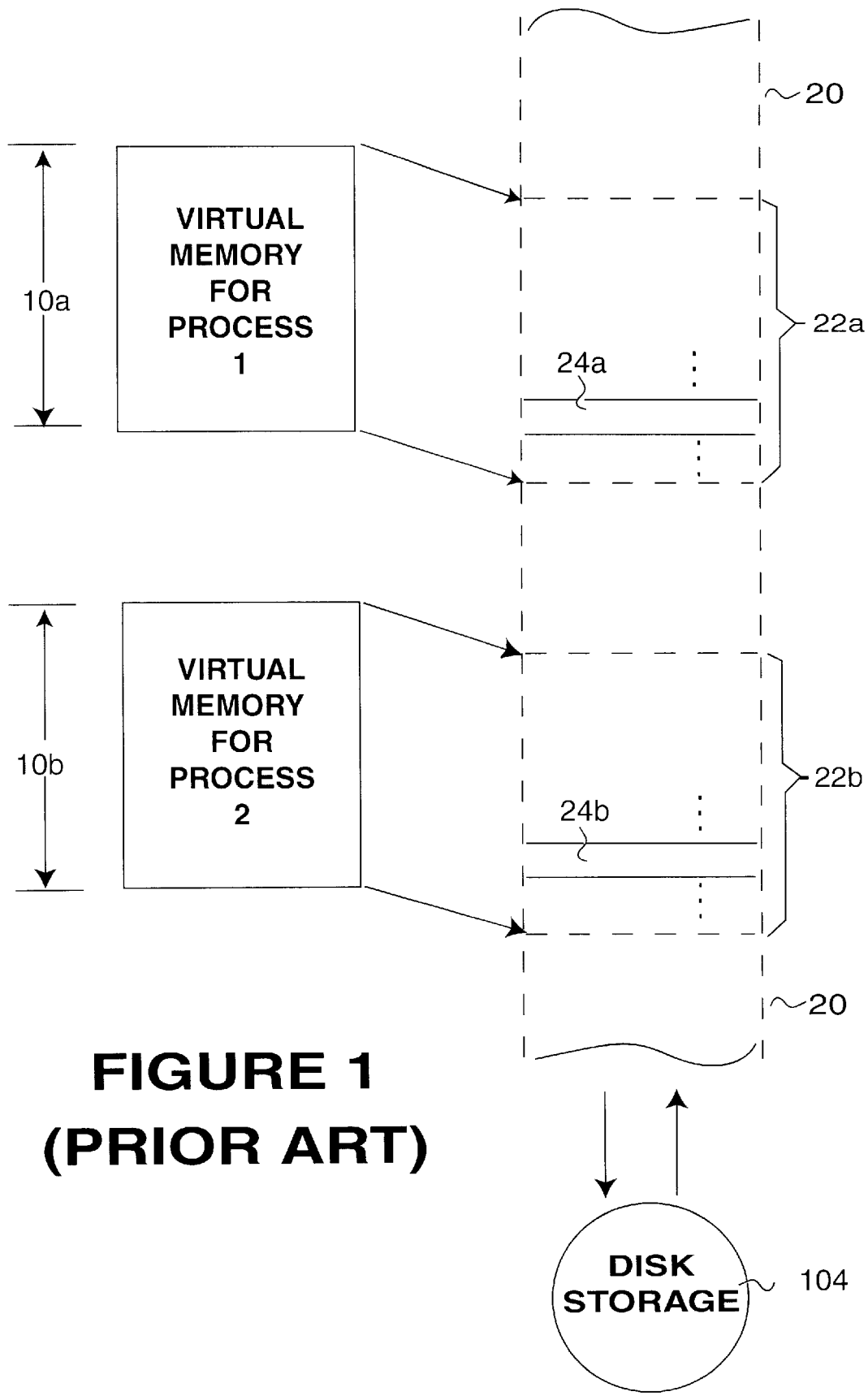
FIG. 1 shows an exemplary prior art virtual memory system (VMS).
Figure 2:
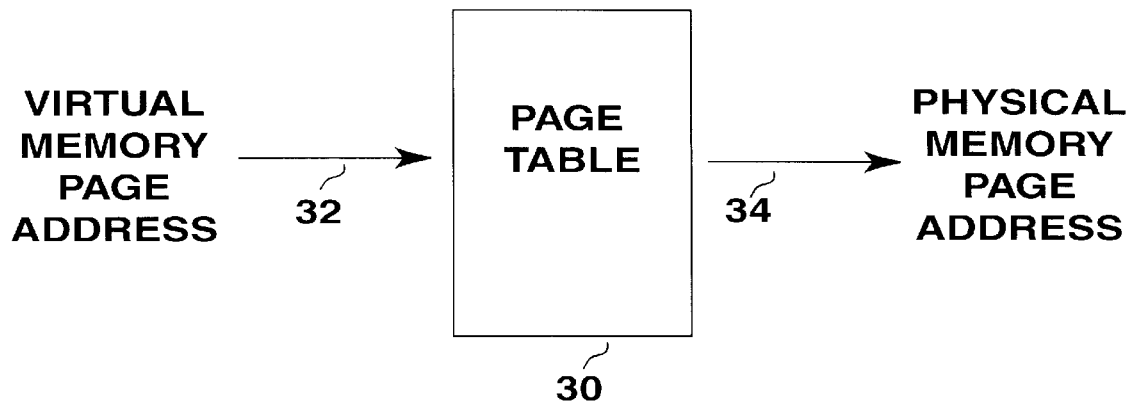
FIG. 2 shows an exemplary prior art page table data structure for a software application.
Figure 3:
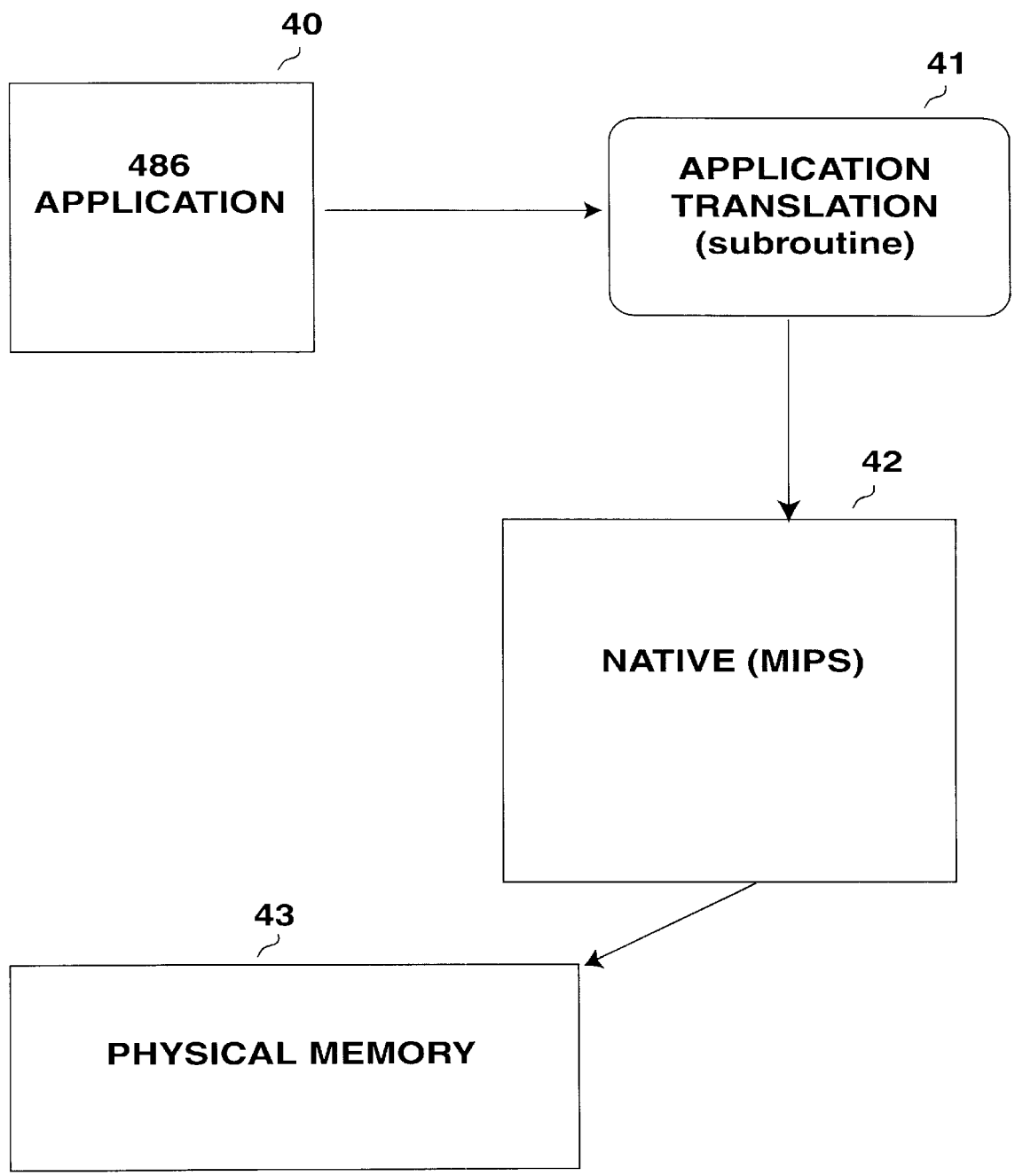
FIG. 3 shows a general flow diagram of the prior art Soft Windows virtual memory emulation process.
Figure 4:
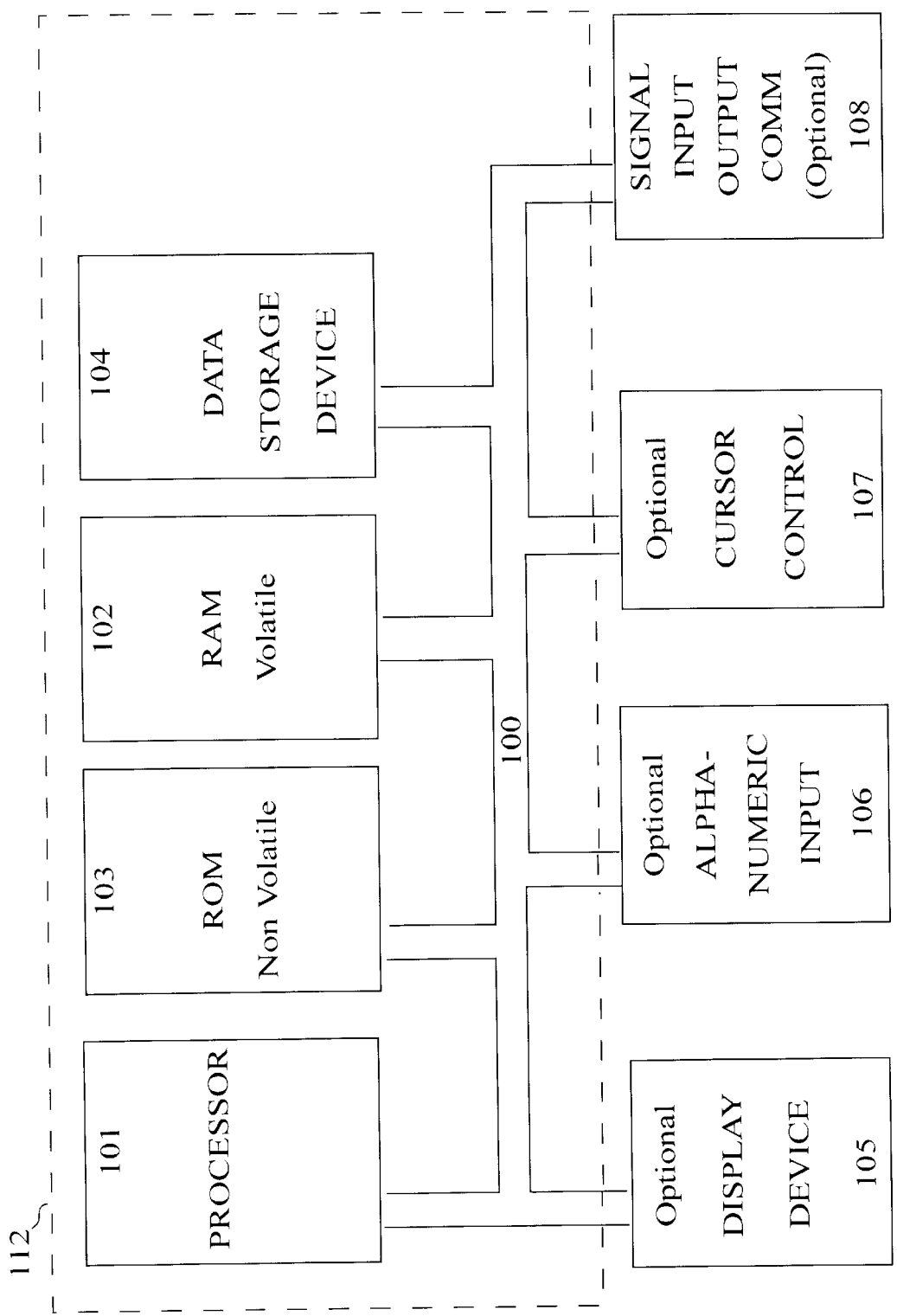
FIG. 4 shows a general purpose computer system in accordance with the present invention.

Refer to FIG. 4 which illustrates a computer system 112. Within the following discussions of the present invention, certain processes and steps are discussed (e.g., process 900 of FIG. 9) that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101. In one implementation of the present invention, system 112 is a MIPS R4000 computer system by Silicon Graphics Inc., of Mountain View, Calif.

The present invention provides a method of translating an emulated virtual memory address space into a physical address space without spending any more than a trivial amount of software processing time translating each emulated virtual memory address into a native virtual memory address. It should be appreciated that the present invention can be adapted to a number of computer architectures. It should also be appreciated that the present invention can emulate a number of different architecture address spaces. As such, in an exemplary embodiment the present invention is implemented on a MIPS architecture computer system and the emulated address space is a flat memory model Intel x86 address space. Thus, the present implementation of the invention provides a method of translating x86 flat model (e.g., emulated) virtual memory address space into MIPS architecture physical address space using no more than a trivial amount of software processing time translating every x86 virtual memory address into a native virtual memory address upon TLB hits.

Figure 5:
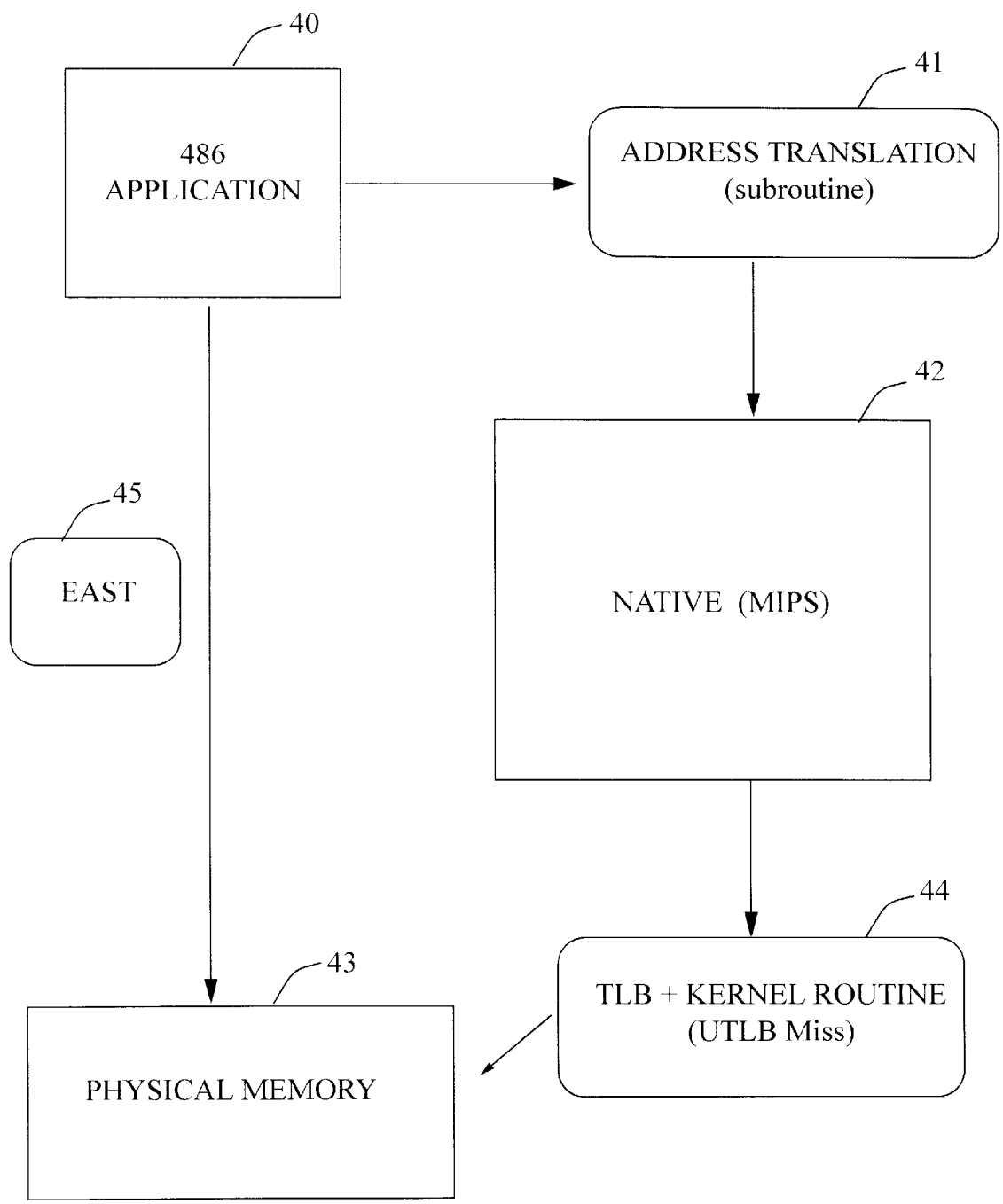
FIG. 5 shows a flow diagram of the address space translation process of the present invention.

FIG. 5 shows an overview of the address space translation process of the present implementation of the invention. As described above, each time a Windows application, in step 40, requests an x86 virtual memory address, the present embodiment translates the address through a software based address translation subroutine, in step 41. The software based address translation subroutine of step 41 is well known in the prior art. In the translation subroutine, the present implementation performs a software based associative look-up in a translation table (a set of x86-to-native translation tables the user-level application maintains in physical memory of the computer system). The present embodiment indexes the translation table with the x86 virtual page number (the emulated page number) to find a matching native virtual page number. The present implementation then works with the memory management architecture of the host computer system 112 to access the native virtual memory address, in step 42. In step 43, the present embodiment then accesses a page table data structure it maintains in main memory 102 and translates the native virtual memory address to a physical memory address. At this point, the present invention stores the emulated virtual page number from the translation table and its associated physical address, in the translation look aside buffer circuit (TLB) of the microprocessor 101 of the computer system 112. In this manner, the emulated address is stored with its corresponding physical address.

The next time the Windows application requests the emulated virtual page number, in step 40, the present invention compares the entries of the TLB with the emulated virtual page number and returns the physical address, in step 45 upon a TLB hit. This TLB emulated address space translation (EAST) is very fast in comparison to the associative look-up in the translation table, because software is not required to perform the translation. The TLB comparison process of the present invention is a hardware based simultaneous comparison(e.g., using context sensitive memory logic, or CAM logic), where the matching register (containing the matching physical address) is found often within one or two clock cycles. Since most Windows applications often use the same virtual page number numerous times, the TLB comparison process of the present invention is much faster than the prior art Soft Windows approach (or other software emulation programs), which must perform a software associative look-up for every emulated virtual page number. The emulated virtual page number is stored with its corresponding physical address each time there is a TLB "miss." In this manner, the TLB is soon filled with the most recently accessed virtual memory addresses, whether they are emulated virtual page numberes or native virtual page number. Each time there is a TLB "hit" (a match with a CAM entry of the TLB) for an emulated virtual page number, the EAST process, step 45, of the present invention saves processing time in comparison to the prior art Soft Windows process. As a result, computer systems running Windows applications through emulation with the address space translation process of the present invention appear much faster than computer systems running Windows applications through the prior art software emulation programs. In this manner, the execution speed of a MIPS computer system while running non-native programs through software emulation is greatly increased.

Figure 6:
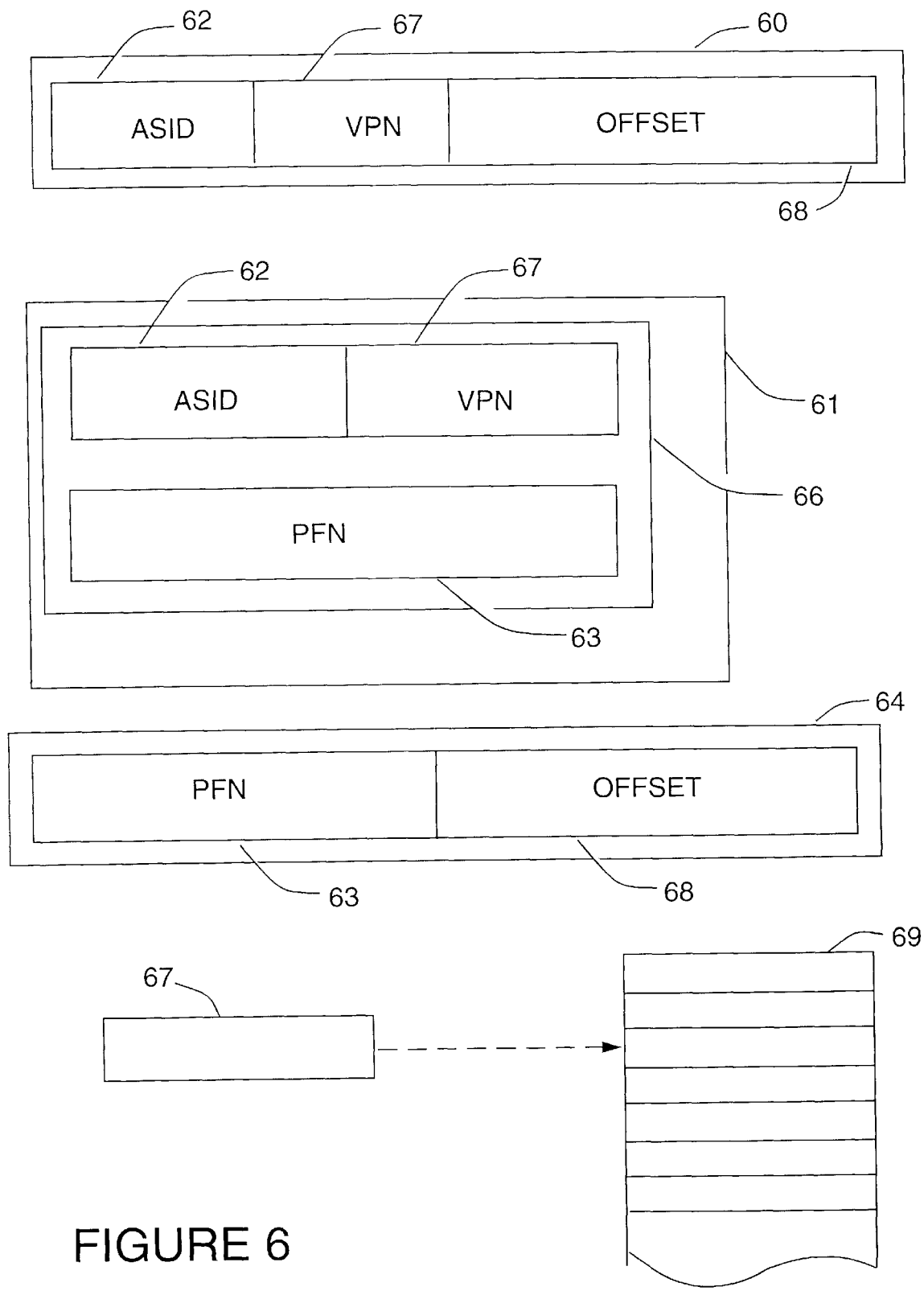
FIG. 6 shows data structures within an exemplary microprocessor memory management and addressing system architecture in accordance with the present invention.

Referring to FIG. 6, an exemplary microprocessor memory management and addressing system architecture in accordance with the present invention is shown. The present exemplary architecture is a MIPS instruction set architecture. It should be appreciated, however, that the address space translation process of the present invention is well adapted to other architectures, such as computer systems based on the Digital Equipment Corporation (DEC) ALPHA microprocessors. Virtual addresses are translated into physical addresses using an on-chip buffer called the translation look aside buffer (TLB) 61. The TLB 61 is a fully associative memory that holds 48 or more entries (depending upon the particular MIPS microprocessor) which provide mapping to a corresponding 48 or more matching page pairs. Entries are searched through the TLB 61 using well known CAM logic. In one embodiment, a virtual address 60 is represented by a virtual page number (VPN) 67 and an offset 68. When a VPN 67 is compared with the TLB 61, each TLB entry 66 is checked via CAM logic simultaneously for a match with the VPN 67 that is extended with an address space identifier (ASID) 62. If there is a VPN match (or hit) in the TLB 61, the page frame number (PFN) 63 is extracted from the TLB and concatenated with the offset 68 to form the physical address 64. The offset 68 does not pass through the TLB. If there is not a VPN match, a TLB "miss" exception is taken by the processor. The native VPN is indexed in the page table data structure 69 in main memory and a page frame number (physical page number) is returned. The operating system then stores the native VPN 67 and its corresponding PFN 63 as a TLB entry 66 in the TLB 61 (the "native procedure"). Thus, on a subsequent access to the same emulated address 60, the PFN 63 from the TLB 61 and is concatenated with the offset 68 to form the physical address 64.

Figure 7:
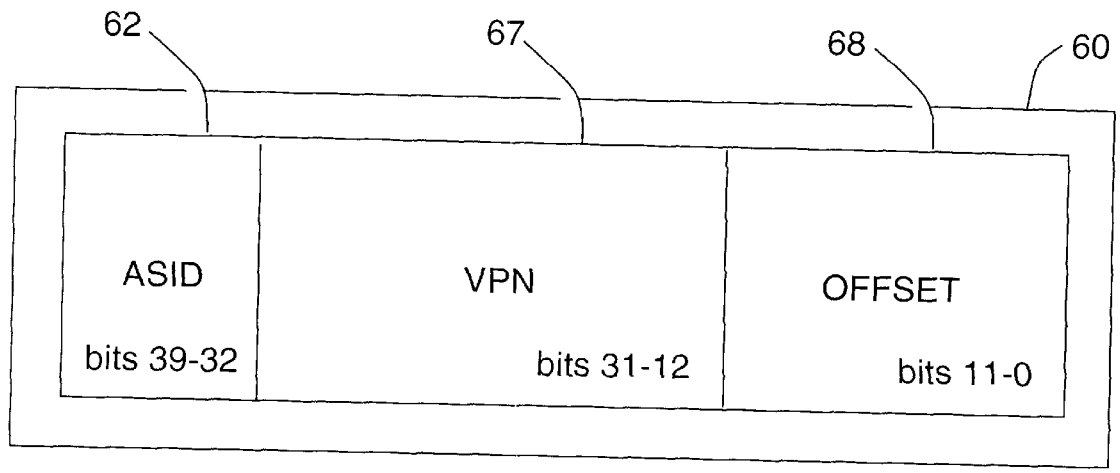
FIG. 7 shows address formats within the virtual to physical address space translation.
Figure 7:
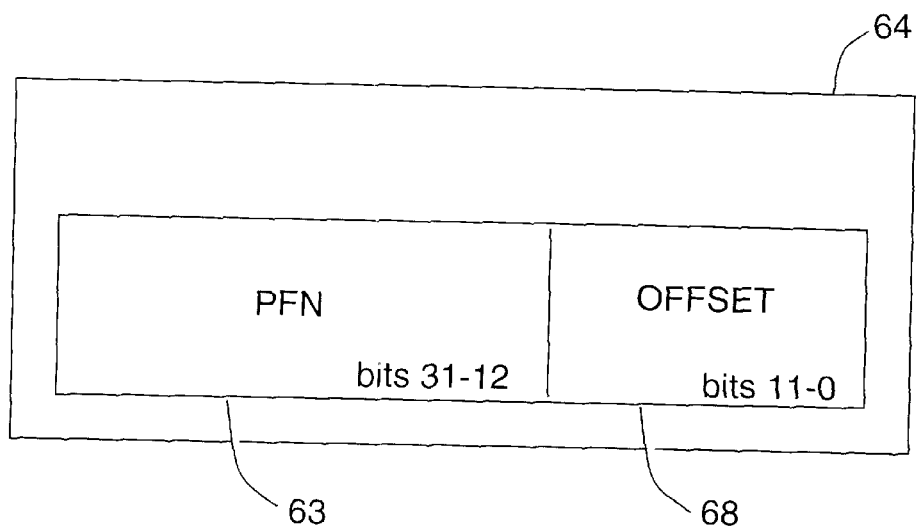

Referring now to FIG. 7, the data structure representing the virtual to physical address space translation is shown. FIG. 7 shows the virtual address 60 of FIG. 6 in more detail. In one embodiment, the native virtual address 60 has a 12 bit, or 4 Kbyte, page size labeled Offset 68. The remaining 20 bits of the address represent the virtual page number (VPN), and index a 1M-entry page table data structure (page table) 69 in main memory. The top 8 bits are the address space identifier (ASID). The native virtual address 60 translates into the physical address 64, where the page frame number (PFN) 63 is either returned from the TLB 61 (TLB hit), or from the page table 69 (TLB miss), and the offset 68 comes directly from the native virtual address 60.

Figure 8:
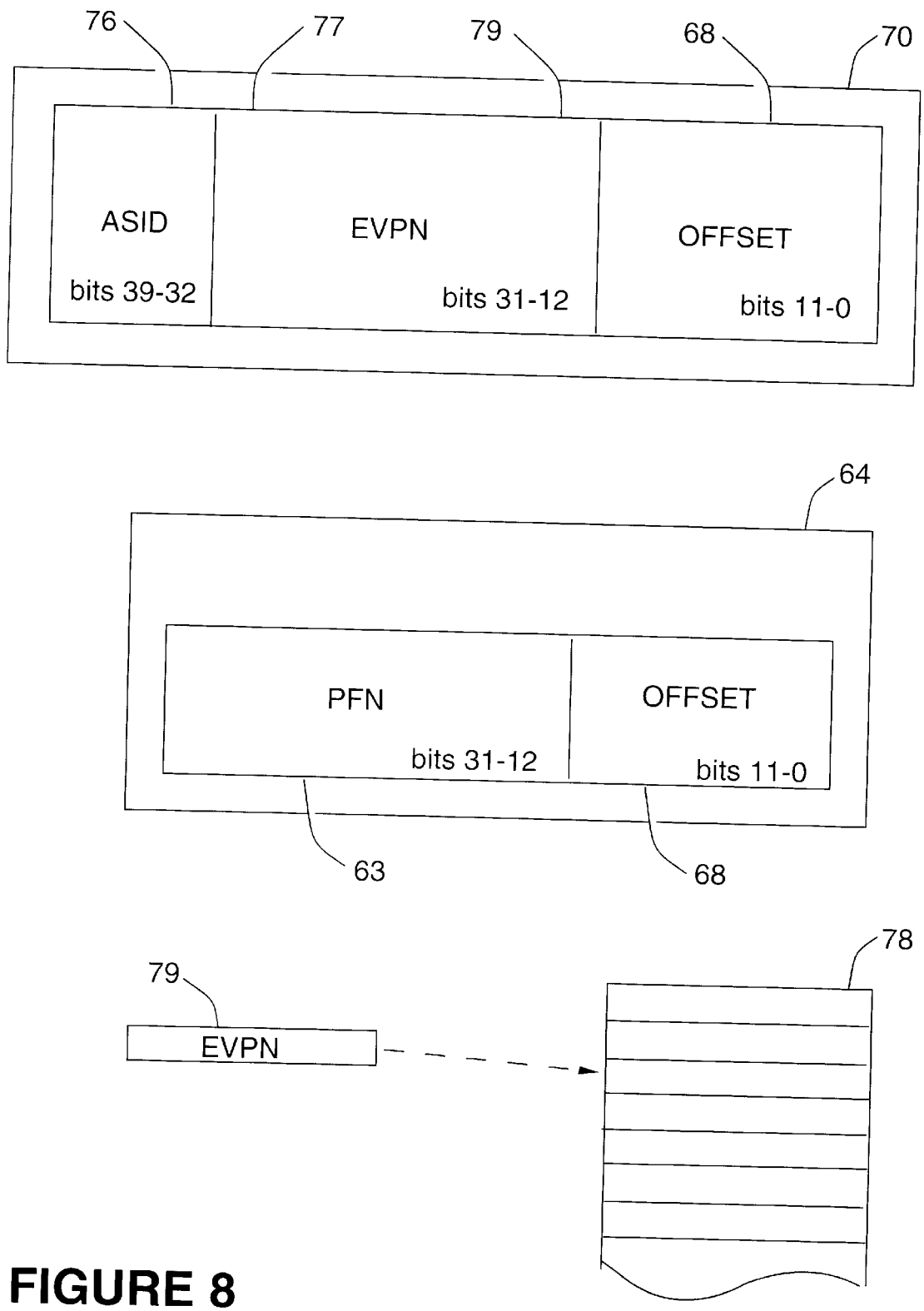
FIG. 8 shows data formats for an emulated virtual address and a physical address.

Referring now to FIG. 8, a user-level application emulated virtual address is shown. The primary difference between the emulated virtual address and the native virtual address is that an emulated virtual page number (EVPN) 79 takes the place of the virtual page number 67. The offset 68 is treated similarly. The emulated virtual page number 79 maps to a native virtual page number maintained in the translation table 78 maintained by Soft Windows. The emulated virtual page number 79 and ASID 76 maps to a native virtual page number in the translation table 78. The offset 68 indexes the 4 Kbyte page. Thus, the translation table 78 maps an emulated virtual page number (e.g. an x86 virtual page number the Windows application works with) to a native virtual page number. The segment number 77 and the page number 79 corresponds to the VPN 67. When the emulated virtual page number 79 is stored as an entry 66 in the TLB 61, the PFN 63 is returned from the TLB 61 on a TLB hit, and the offset 68 comes directly from the emulated virtual address 70. Thus, the present invention treats both an emulated virtual address and a native virtual address the same in the case of a TLB hit.

The present invention treats the emulated virtual address differently from the native virtual address in the case of a TLB miss. For the emulated virtual address 70, when there is a TLB miss, the present invention follows a TLB miss emulated procedure. In this procedure, the present invention accesses the translation table 78 and performs an associative look-up, as described above, to return a native virtual page number. The native virtual page number is indexed in the page table data structure 69 and a PFN 63 is returned. The present invention then stores the emulated virtual page number 79 and its corresponding PFN 63 as a TLB entry 66 in the TLB 61 (the "emulated procedure"). Thus, on a subsequent access to the same emulated virtual address 70, the PFN 63 is returned from the TLB 61 and concatenated with the offset 68 to form the physical address 64. It should be appreciated that the present invention uses 64 bit addressing (40 significant bits) in an otherwise 32 bit emulator. Native 32 bit addresses in the MIPS architecture are really 64 bit addresses with the higher order bits being zero. The present invention essentially maps a 32 bit x86 virtual address space into a portion of the 64 bit MIPS native virtual address space.

The present invention determines whether the virtual address is an emulated virtual address or a native virtual address by examining the ASID 76. In one embodiment, if the ASID 76 is a non-zero value, it indicates the virtual address is an emulated virtual address, wherein the ASID 76 specifies which x86 address space must be accessed, and the TLB miss emulated procedure is followed. If the ASID 76 is a zero value, it indicates that the virtual address 70 is a native virtual address and the TLB miss native procedure is followed.

It should be appreciated that the translation table 78 is a data structure maintained in main memory by an application level emulation program (e.g., Soft Windows) and that the specific format and access procedures may change from one embodiment of the invention to another. The following characteristics, however, should remain constant. The translation table is indexed by the ASID/emulated virtual page pair and contains a mapping from this pair to a native virtual address. In addition, it contains protection information. In a virtual address system, each page typically has associated with it, one or more sets of "protection bits" which are used to indicate whether the information on the page is valid, read-only, read-write, and the like. The present invention utilizes this information during a TLB miss.

At TLB miss, the present invention extracts the protection bits from the translation table and selects which bits to use based on the current operating mode of the emulated computer system (e.g., supervisor mode or user mode in the Soft Windows embodiment). The selected bits are then intersected with the bits from the native virtual page. The protection bits derived in this manner are subsequently stored in a TLB entry along with the corresponding emulated virtual page number to page frame number mapping.

When a protection fault occurs on an emulated virtual address (e.g., the application tries to write to a page which is marked "read only"), the present invention determines whether the protection fault was caused by the protection bits extracted from the page table, or from the translation table. In the former case, the operating system of the host computer system corrects the protection fault, while in the latter case, the application level emulation program (e.g., Soft Windows) is called upon to correct the protection fault and update the translation table, at which point the TLB is refreshed and the instruction which caused the protection fault re-executed.

Figure 9:
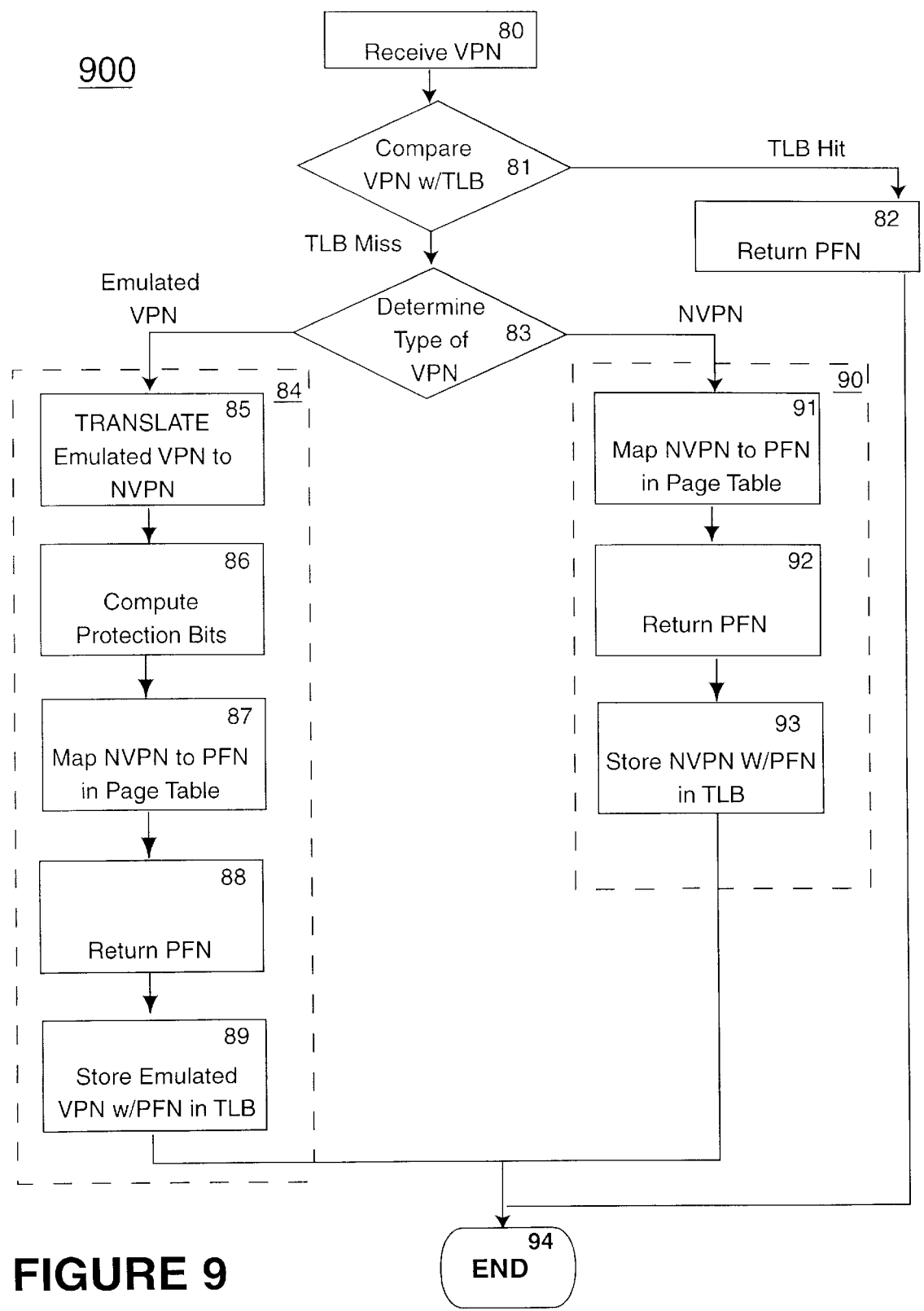
FIG. 9 shows a flow chart of the steps of the process of the present invention.

Referring now to FIG. 9, a flow chart of the steps of the process 900 of the present invention is shown. It is appreciated that steps of process 900 are implemented as instructions, or program code, stored within computer usable memory units of system 112 (FIG. 4). The address space translation process 900 of the present invention begins when a virtual page number is received from an application, in step 80. The application can be a native software application or some other native process (e.g., the operating system). The application can also be a Windows application running through a user-level emulation application. In step 81, the virtual page number (VPN) is compared with the entries of the TLB 61. As described above, the TLB 61 is a hardware based buffer which performs a simultaneous comparison with all TLB entries looking for a hit with the virtual page number. Therefore, step 81 is realized in circuitry. If there is a hit, the TLB 61 returns the corresponding page frame number. The TLB 61 is designed to store the most recent virtual page number/page frame number pairs.

In the case of a TLB hit, in step 81, the TLB 61 immediately (typically two or less clock cycles) returns the page frame number corresponding to the virtual page number. As described above, the TLB 61 stores virtual page numbers with their corresponding page frame numbers regardless of whether the virtual page numbers are emulated virtual page numbers or native virtual page numbers. When the virtual page number has a match in the TLB 61, the corresponding page frame number is located and returned without costly software look-up routines. In step 82, the corresponding page frame number is located and returned and the process 900 ends in step 94. Thus, each time a previously accessed virtual page number is received, the process of the present invention executes steps 81, 82, and 94. Steps 81 and 82 are implemented in the CAM logic circuitry of the TLB 61 and execute within one or two clock cycles, as opposed to the costly software associative look-up procedures of the prior art. This greatly increases the speed of applications running on the computer system 112. Thus, non-native applications run much faster using the process of the present invention.

In the case of a TLB miss, step 83 is entered where the present invention determines what type of virtual page number with which it is working. The determination is made by checking the corresponding ASID of the virtual page number, as described above. Where the ASID is a non-zero value, the virtual page number is an emulated virtual page number. Where the ASID is a zero value, the virtual page number is a native virtual page number (NVPN).

For emulated virtual page numbers, the present invention then initiates the TLB miss emulated procedure 84. In step 85, the emulated virtual page number is translated to a native virtual page number using a translation table maintained in main memory 104 by the user-level application. This is an associative index search performed in software which consumes a relatively large number of clock cycles. From the translation table, a native virtual page number corresponding to the emulated virtual page number is returned. In step 86, the present invention computes protection bits. The present invention extracts the protection bits from the translation table and selects which bits to use based on the current operating mode of the emulated computer system and then intersects these bits with the bits from the native virtual page. The derived protection bits are subsequently stored in a TLB entry along with the corresponding emulated virtual page number to page frame number mapping and are used to handle protection faults. In step 87, the present invention next indexes the native virtual page number in a page table data structure it maintains in main memory 104. This is also an associative index search performed in software, consuming a relatively large number of clock cycles. In step 88, a corresponding page frame number (PFN) is returned to the application that presented the virtual page number in step 80. In step 89, the page frame number and the matching emulated virtual page number are stored as a TLB entry 66 in the TLB 61. The next time this emulated virtual page number is received there will be a hit in the TLB 61. The process 900 then ends in step 94, and begins when the next virtual page number is received.

For native virtual page numbers, when there is a TLB miss, the present invention relies upon a TLB miss native procedure 90 (which is actually carried out by the operating system of the computer, as described above). In step 91, the operating system indexes the native virtual page number in the page table data structure. As in step 87, this is a long associative index search performed in software. In step 92, a corresponding page frame number is returned. In step 93, the page frame number and the matching native virtual page number are stored as a TLB entry 66 in the TLB 61. The next time this native virtual page number is received there will be a hit in the TLB 61 and the corresponding page frame number is located without the software look-up procedures. The process 900 then ends in step 94, and begins when the next virtual page number is received.

The present invention, a method and system for address space translation, is thus disclosed. While the present invention has been described in particular embodiments, it should be appreciated that the present invention should not be construed as limited by such embodiments, but rather construed according to the below claims.

What is claimed is:

1. In a computer system having a microprocessor with a translation look aside buffer circuit (TLB), a computer implemented method for translating addresses of an emulated virtual address space into addresses of a physical address space, the method comprising the computer implemented steps of:

(a) receiving a virtual address;

(b) comparing the virtual address with entries of the TLB;

(c) returning a physical address from the TLB when there is a match in an entry of the TLB with the virtual address;

(d) provided there is not a match in step (c), determining whether the virtual address is an emulated virtual address or a native virtual address by checking an address space identifier included in the virtual address;

(e) provided virtual address is an emulated virtual address, translating the virtual address to a corresponding physical address;

(f) storing into an entry of the TLB, the emulated virtual address and the corresponding physical address.

2. The method of claim 1 further including the steps of:

provided the virtual address is a native virtual address and provided further there is not a match in the TLB, storing the virtual address and the corresponding physical address in the TLB; and provided the virtual address is an emulated virtual address and provided further there is not a match in the TLB, storing the virtual address and the corresponding physical address in the TLB.

3. The computer implemented method of claim 1 wherein step (a) comprises the step of receiving a virtual address from a native process.

4. The computer implemented method of claim 1 wherein step (a) comprises the step of receiving a virtual address from a non-native process.

5. The computer implemented method of claim 1 wherein step (b) includes comparing the virtual address with a plurality of TLB entries contained in the TLB, wherein each of the plurality of TLB entries include a virtual page number and a page frame number.

6. The computer implemented method of claim 5 wherein step (c) comprises the steps of:

matching the virtual address with one entry of the plurality of TLB entries and returning a page frame number included therein;

concatenating the page frame number with an offset to obtain a physical address; and returning the physical address.

7. The computer implemented method of claim 1 wherein step (e) comprises the steps of:

indexing a translation table with the emulated virtual address;

returning a matching native virtual address;

indexing a page table stored in a memory unit with the matching native virtual address to locate a corresponding physical address; and returning the corresponding physical address.

8. The computer implemented method of claim 7 wherein step (f) comprises the steps of:

storing a virtual page number from the emulated virtual address and an address space identifier from the emulated virtual address into one of a plurality of entries in the TLB; and storing a page frame number from the corresponding physical address into said one of a plurality of entries such that said one of a plurality of entries has stored within it the virtual page number, the address space identifier, and the page frame number.

9. A computer system having a processor with a translation look aside buffer (TLB) coupled to a bus and a memory coupled to the bus, the memory for containing a set of instructions that when executed by the processor causes the computer system to implement a method of translating an emulated virtual address space into a physical address space, the method comprising the computer system performing the steps of:

(a) receiving a virtual address;

(b) comparing the virtual address with entries of the TLB;

(c) returning a physical address from the TLB when there is a match in an entry of the TLB with the virtual address;

(d) provided there is not a match in step (c), determining whether the virtual address is an emulated virtual address or a native virtual address by checking an address space identifier included in the virtual address;

(e) provided virtual address is an emulated virtual address, translating the virtual address to a corresponding physical address;

(f) storing into an entry of the TLB, the emulated virtual address and the corresponding physical address.

10. The method of claim 9 further including the steps of:

provided the virtual address is a native virtual address and provided further there is not a match in the TLB, storing the virtual address and the corresponding physical address in the TLB; and provided the virtual address is an emulated virtual address and provided further there is not a match in the TLB, storing the virtual address and the corresponding physical address in the TLB.

11. The computer implemented method of claim 9 wherein step (a) comprises the step of receiving a virtual address from a native process.

12. The computer implemented method of claim 9 wherein step (a) comprises the step of receiving a virtual address from a non-native process.

13. The computer implemented method of claim 9 wherein step (b) includes comparing the virtual address with a plurality of TLB entries contained in the TLB, wherein each of the plurality of TLB entries include a virtual page number and a page frame number.

14. The computer implemented method of claim 12 wherein step (c) comprises the steps of:

matching the virtual address with one entry of the plurality of TLB entries and returning a page frame number included therein;

concatenating the page frame number with an offset to obtain a physical address; and returning the physical address.

15. The computer implemented method of claim 9 wherein step (e) comprises the steps of:

indexing a translation table with the emulated virtual address;

returning a matching native virtual address;

indexing a page table stored in a memory unit with the matching native virtual address to locate a corresponding physical address; and returning the corresponding physical address.

16. The computer implemented method of claim 15 wherein step (f) comprises the steps of:

storing a virtual page number from the emulated virtual address and an address space identifier from the emulated virtual address into one of a plurality of entries in the TLB; and storing a page frame number from the corresponding physical address into said one of a plurality of entries such that said one of a plurality of entries has stored within it the virtual page number, the address space identifier, and the page frame number.

17. In a computer system using a native virtual address space and having a processor and a physical memory, a method for translating addresses, said method comprising the steps of:

a) receiving a first emulated virtual address of an emulated address space of a first application, wherein said computer system performs emulation to execute said first application and wherein said first application is executing within said emulated address space;

b) translating said first emulated virtual address into a first native virtual address, said step b) performed using a software procedure accessing an associative translation table of said physical memory, said associative translation table storing both emulated virtual addresses and native virtual addresses, wherein said software procedure is executing within said native address space;

c) indexing, with said first native virtual address, an entry of a page table stored in said physical memory to access a first physical address stored therein, said first physical address corresponding to said first native virtual address; and d) storing in an entry of a translation lookaside buffer (TLB) within said processor both said first emulated virtual address received in step a) and said first physical address.

18. A method as described in claim 17 further comprising the steps of:

e) receiving a second emulated virtual address, said second emulated virtual address of said emulated address space of said first application;

f) looking up said second emulated virtual address within entries of said TLB to determine a matching TLB entry therewith; and g) upon a match, returning to said first application a physical address stored within said matching entry of said TLB, said step g) performed using circuitry.

19. A method as described in claim 18 wherein said step g) is performed using content sensitive memory (CAM) circuitry.

20. A method as described in claim 17 further comprising the steps of:

e) receiving a second native virtual address, said second native virtual address of said native virtual address space of said computer system;

f) indexing, with said second native virtual address, an entry of said page table to access a second physical address stored therein, said second physical address corresponding to said second native virtual address; and g) storing in an entry of said TLB both said second native virtual address received in step e) and said second physical address.

21. A method as described in claim 20 further comprising the steps of:

h) receiving a third native virtual address;

i) looking up said third native virtual address within entries of said TLB to determine a matching entry therewith; and j) upon a match, returning to said first application a physical address stored within said matching entry of said TLB.

* * * * *